(No Model.)
M. ARNOLD.
RIVET.
No. 361,390. Patented Apr. 19, 1887.
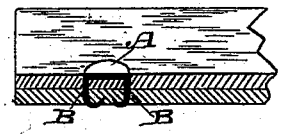
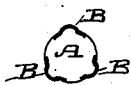
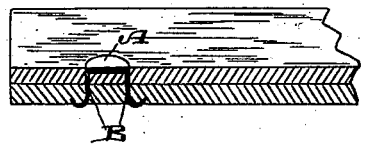
Witnesses,
Geo. H. Strong.
J. B. Nourse
Inventor,
M. Arnold
By Dewey & Co.
attys

UNITED STATES PATENT OFFICE.

MATTHEW ARNOLD, OF SAN FRANCISCO, CALIFORNIA.

RIVET.

SPECIFICATION forming part of Letters Patent No. 361,390, dated April 19, 1887.

Application filed September 16, 1886. Serial No. 213,733. (No model.)

*To all whom it may concern:*

Be it known that I, MATTHEW ARNOLD, of the city and county of San Francisco, State of California, have invented an Improvement in Rivets, of which the following is a specification.

My invention relates to an improved rivet for securing flexible articles, such as leather, together.

It consists of the improved rivet I will hereinafter describe and claim.

Referring to the accompanying drawings for a more complete explanation of my invention, Figure 1 is a view of my rivet, showing three arms or prongs. Fig. 2 is a section of two united pieces, showing one method of folding the points of the rivet. Fig. 3 shows another method for the same. Figs. 4, 5, and 6 show different forms of corrugations of the legs.

A is the head, which may be circular or other suitable shape, and B B are legs or projections which are formed with it. The whole may be cut out of suitable sheet metal and struck up by die or machine, so that the legs or extensions stand parallel with each other and at right angles with the plane of the head. These legs or extensions are formed with points upon the ends opposite the head A, so that they may be easily driven through the leather or other material which it is desired to fasten together, and after they have passed through the material the points which project slightly upon the opposite side may be folded down, either inwardly or outwardly, as shown in the drawings, thus securing the rivet firmly in place. The legs are longitudinally corrugated or fluted to give additional strength, so that they may be driven without buckling or bending.

Having thus described my invention, what I claim as new, and desire to secure by Letters Patent, is—

A rivet having the circular-shaped head, in combination with legs or extensions projecting at right angles therefrom, said legs being corrugated or fluted longitudinally, substantially as herein described.

In witness whereof I have hereunto set my hand.

MATTHEW ARNOLD.

Witnesses:
S. H. NOURSE,
H. C. LEE.